US012561612B2

(12) United States Patent
Sattigeri et al.

(10) Patent No.: US 12,561,612 B2
(45) Date of Patent: Feb. 24, 2026

(54) MITIGATING THE INFLUENCE OF BIASED TRAINING INSTANCES WITHOUT REFITTING

(71) Applicant: International Business Machines Corporation, Armonk, NY (US)

(72) Inventors: Prasanna Sattigeri, Acton, MA (US); Soumya Ghosh, Boston, MA (US); Inkit Padhi, White Plains, NY (US); Pierre L. Dognin, White Plains, NY (US); Kush Raj Varshney, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 707 days.

(21) Appl. No.: 18/045,253

(22) Filed: Oct. 10, 2022

(65) Prior Publication Data

US 2024/0135238 A1     Apr. 25, 2024

(51) Int. Cl.
*G06N 20/00*          (2019.01)
*G06F 17/16*          (2006.01)

(52) U.S. Cl.
CPC ............. *G06N 20/00* (2019.01); *G06F 17/16* (2013.01)

(58) Field of Classification Search
CPC ................................ G06N 20/00; G06F 17/16
See application file for complete search history.

(56) References Cited

U.S. PATENT DOCUMENTS

| 11,263,550 | B2 | 3/2022 | Vasconcelos et al. | |
| 11,302,096 | B2 | 4/2022 | Lohia et al. | |
| 12,175,350 | B2 * | 12/2024 | Vahdat ................... | G06N 3/092 |
| 2020/0057959 | A1 | 2/2020 | Moore et al. | |

(Continued)

OTHER PUBLICATIONS

Prasanna Sattigeri, Soumya Ghosh, Inkit Padhi, Pierre Dognin, and Kush Varshney, "Fair Infinitesimal Jackknife: Mitigating the Influence of Biased Training Data PointsWithout Refitting," Submitted to 36th Conference on Neural Information Processing Systems (NeurIPS 2022).

*Primary Examiner* — Kenneth B Lee, Jr.
(74) *Attorney, Agent, or Firm* — Amin, Turocy & Watson, LLP

(57)          ABSTRACT

One or more systems, devices, computer program products and/or computer implemented methods of use provided herein relate to a process of mitigating biased training instances associated with a machine learning model without additional refitting of the machine learning model. A system can comprise a memory that stores computer executable components, and a processor that executed the computer executable components stored in the memory, wherein the computer executable components can comprise a training data influence estimation component and an influence mitigation component. The training data influence estimation component can receive a pre-trained machine learning model and calculate a fairness influence score of training instances on group fairness metrics associated with the pre-trained machine learning model. The influence mitigation component can perform post-hoc unfairness mitigation by removing the effect of at least one training instance based on the fairness influence score to mitigate biased training instances without refitting the pre-trained machine learning model.

20 Claims, 9 Drawing Sheets

(56) References Cited

U.S. PATENT DOCUMENTS

| | | | |
|---|---|---|---|
| 2020/0151555 A1 | 5/2020 | Kozhaya et al. | |
| 2020/0184350 A1 | 6/2020 | Bhide et al. | |
| 2020/0226489 A1 | 7/2020 | Li et al. | |
| 2020/0380310 A1* | 12/2020 | Weider | G06F 18/2185 |
| 2020/0387836 A1* | 12/2020 | Nasr-Azadani | G06N 20/20 |
| 2021/0365965 A1* | 11/2021 | Shrivastava | G06N 3/088 |
| 2022/0172004 A1 | 6/2022 | Das et al. | |
| 2022/0188328 A1 | 6/2022 | Boldrin et al. | |
| 2022/0383185 A1* | 12/2022 | Zhu | G06N 3/0455 |

* cited by examiner

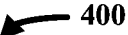

400

---

Algorithm 1 FairIJ

1: Input: Pre-trained model parameters $\hat{\theta}$, training set $\mathcal{D}$, loss function $\ell$, a validation set $\mathcal{D}_{val}$ and a smooth surrogate to the fairness metric $b \in \{\Delta DP, \Delta EO\}$, $M_{\mathcal{D}_{val}}^b$.

2: Calculate: $H^{-1}g_n$ for each training instance $z_n$ by setting $k_1 = g_n$ and iterating through Equation 14 for B iterations.

3: Calculate: the fairness influence $\mathcal{I}_{b,n}$ of each training instance $z_n$ on $\mathcal{D}_{val}$ using Equation 7 or Equation 8.

4: Construct: the set $\mathcal{D}_-$ and denote its cardinality, $|\mathcal{D}_-| = K$.

5: Initialize: $\theta_{fair}^0 := \hat{\theta}$

6: for $k \in \{1, \ldots, K\}$ do

7:     Construct: $\mathcal{D}_-^k = \{z_n \in \mathcal{D}_- \mid \mathcal{I}_{b,n} > \mathcal{I}_{b,(K-k)}\}$, where $\mathcal{I}_{b,(K-k)}$ denotes the $(K-k)^{th}$ order statistic of the influence scores $\{\mathcal{I}_{b,1}, \ldots, \mathcal{I}_{b,K}\}$.

8:     Calculate: $\theta_{fair}^k$ by replacing $\mathcal{D}_-$ with using $\mathcal{D}_-^k$ in Equation 16.

9:     if $b_{\mathcal{D}_{val}}(\theta_{fair}^k) < b_{\mathcal{D}_{val}}(\theta_{fair}^{k-1})$ then

10:         $\theta_{fair} := \theta_{fair}^k$

11:     else

12:         $\theta_{fair} := \theta_{fair}^{k-1}$

13:         break

14:     end if

15: end for

16: Return: fair model parameters $\theta_{fair}$.

| Model | BA | $\Delta$EO | BA | $\Delta$DP |
|---|---|---|---|---|
| BERT$_{LC}$-ERM | 57.3 | 0.314 | 58.4 | 0.246 |
| BERT$_{NC}$-ERM | 59.3 | 0.326 | 59.3 | 0.261 |
| BERT$_{LC}$-GapReg | 57.9 | 0.133 | 57.5 | 0.185 |
| BERT$_{NC}$-GapReg | 59.1 | 0.144 | 58.2 | 0.054 |
| BERT$_{LC}$-FairIJ | 58.6 | 0.125 | 57.1 | 0.011 |
| BERT$_{NC}$-FairIJ | 59.8 | 0.126 | 58.6 | 0.008 |

← 702

| Model | BA | $\Delta$EO | BA | $\Delta$DP |
|---|---|---|---|---|
| BERT$_{TT=4}$-ERM | 57.5 | 0.360 | 57.5 | 0.268 |
| BERT$_{TT=9}$-ERM | 58.2 | 0.317 | 58.2 | 0.254 |
| BERT$_{TT=10}$-ERM | 58.3 | 0.348 | 58.3 | 0.234 |
| BERT$_{TT=4}$-FairIJ | 56.0 | 0.102 | 55.2 | 0.042 |
| BERT$_{TT=9}$-FairIJ | 56.5 | 0.113 | 56.4 | 0.071 |
| BERT$_{TT=10}$-FairIJ | 57.2 | 0.110 | 56.6 | 0.089 |

FIG. 7

900

COMPUTER   901

PROCESSOR SET   910

PROCESSING CIRCUITRY   920          CACHE   921

COMMUNICATION FABRIC   911

VOLATILE MEMORY   912

PERSISTENT STORAGE   913

OPERATING SYSTEM 922

1000

PERIPHERAL DEVICE SET   914

UI DEVICE SET   923          STORAGE   924          IoT SENSOR SET   925

NETWORK MODULE   915

WAN   902

END USER DEVICE   903

REMOTE SERVER   904

REMOTE DATABASE   930

PRIVATE CLOUD   906

GATEWAY   940

PUBLIC CLOUD   905

CLOUD ORCHESTRATION MODULE   941          HOST PHYSICAL MACHINE SET   942

VIRTUAL MACHINE SET   943          CONTAINER SET   944

FIG. 9

MITIGATING THE INFLUENCE OF BIASED TRAINING INSTANCES WITHOUT REFITTING

STATEMENT REGARDING PRIOR DISCLOSURES BY THE INVENTOR OR A JOINT INVENTOR

The following disclosures are submitted under 35 U.S.C. 102(b)(1)(A):

DISCLOSURE: [Fair Infinitesimal Jackknife: Mitigating the Influence of Biased Training Data Points Without Refitting, Prasanna Sattigeri, Soumya Ghosh, Inkit Padhi, Pierre Dognin, Kush Varshney, 2022, 1-18].

BACKGROUND

One or more embodiments described herein relate generally to mitigating the influence of biased training instances, and more specifically, to a system that mitigates biased training instances without refitting the model. Embodiments relate to calculating a fairness influence score and removing the effect of at least one of the training instances based on the fairness influence score.

SUMMARY

The following presents a summary to provide a basic understanding of one or more embodiments described herein. This summary is not intended to identify key or critical elements, or delineate any scope of the particular embodiments or any scope of the claims. The sole purpose of the summary is to present concepts in a simplified form as a prelude to the more detailed description that is presented later. In one or more embodiments described herein, systems, devices, computer-implemented methods, and/or computer program products that facilitate bias mitigation for training data are described.

According to an embodiment, a system can comprise a memory that stores computer executable components, and a processor operably coupled to the memory that executes the computer executable components stored in the memory. The system can include a training data influence estimation component that can receive a pre-trained machine learning model and calculate a fairness influence score of training instances on group fairness metrics associated with the pre-trained machine learning model. The system can also include an influence mitigation component that can perform post-hoc unfairness mitigation by removing the effect of at least one training instance based on the fairness influence score to mitigate biased training instances without refitting the pre-trained machine learning model.

According to another embodiment, a computer-implemented method for mitigating biased training instances associated with a machine learning model without additional refitting of the machine learning model can include receiving, using a processor, a pre-trained machine learning model and calculating a fairness influence score of training instances on group fairness metrics associated with the pre-trained machine learning model. The method can include performing, using the processor, post-hoc unfairness mitigation by removing the effect of at least one of the training instances based on the fairness influence score.

According to yet another embodiment, a computer program product for mitigating biased training instances associated with a machine learning model without additional refitting of the machine learning model can comprise a computer readable storage medium having program instructions embodied therewith, the program instructions executable by a processor can cause the processor to receive a pre-trained machine learning model and calculate a fairness influence score of training instances on group fairness metrics associated with the pre-trained machine learning model. Additionally, the program instructions can cause the processor to perform post-hoc unfairness mitigation by removing the effect of at least one of the training instances based on the fairness influence score.

DESCRIPTION OF THE DRAWINGS

FIG. 4 illustrates an algorithm that can facilitate mitigating biased training instances associated with a machine learning model without additional refitting of the machine learning model, in accordance with one or more embodiments described herein.

FIG. 7 illustrates two tables reporting the difference in equality of odds, difference in demographic party, and task balanced accuracy resulting from application of the non-limiting system, in accordance with one or more embodiments described herein.

FIG. 9 illustrates a block diagram of an example, non-limiting operating environment in which one or more embodiments described herein can be facilitated.

DETAILED DESCRIPTION

Figure 1:
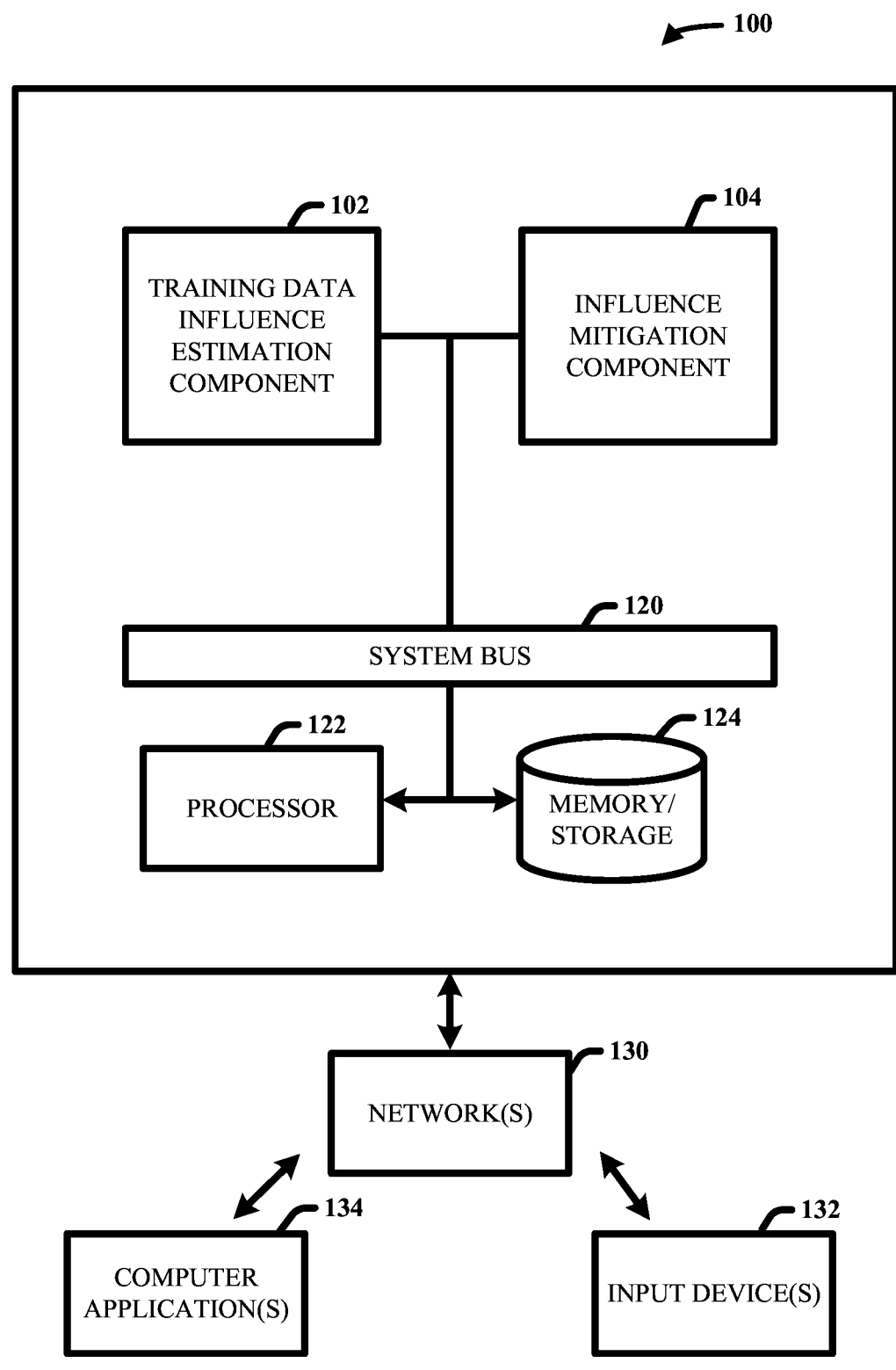
FIG. 1 illustrates a block diagram of an example, non-limiting system that can facilitate mitigating biased training instances associated with a machine learning model without additional refitting of the machine learning model, in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in this Detailed Description section.

Among the many possible interventions to improve equity in society, bias mitigation algorithms constitute a sector that has emerged in the machine learning literature to address distributive justice in high-stakes decision making. Such algorithms can be classified into pre-processing, in-processing, and post-processing approaches. In the case of pre-processing algorithms, bias mitigation can occur at the model training stage, which is typically achieved by minimizing the empirical risk regularized by a fairness metric surrogate (e.g., that can capture the dependence of the prediction and the sensitive attribute).

With embodiments, pre-processing methods that transform data points can run the risk of losing the semantics of the original data points. Often, pre-processing methods can be expensive, especially for high-dimensional data and large datasets. Further, pre-processing methods are performed before training any task-specific models and are not applicable when the goal is to improve a model already trained with an expensive procedure. Pre-processing methods, typically, learn transformation of the data distribution such that they do not contain information about the sensitive attributes. Task specific models can then be learned from scratch on the debiased representations.

In examples, retraining a model from scratch is intractable in many real-world situations for a variety of reasons including policy, cost, and technical feasibility (e.g., post-processing approaches can be the most viable option in such cases). Existing post-processing bias mitigation algorithms tend to either randomly or deterministically alter the hard or soft predicted label of individual test data points that have been scored by a model (e.g., when limiting to notions of group fairness such as demographic parity and equality of opportunity). Additionally, existing post processing methods learn to transform the predictions of a trained model to satisfy a measure of fairness. Such models can often be limiting as they do not provide control over the fairness/ accuracy trade-off and can require predicted scores to be well-calibrated which can lead to excessive reduction in performance.

In-processing algorithmic fairness methodologies can be applicable when models are trained along with fairness constraints. For example, such methodologies can include (i) enforcing independence through a relaxation of the Hirschfeld-Gebelein-Rényi Maximum Correlation Coefficient (HGR) dependency measure; (ii) using the Hilbert-Schmidt Independence Criterion (HSIC) to reduce the dependence of the representations on the sensitive attributes; (iii) using one or more data augmentation strategy to improve the generalization properties of in-processing algorithms. The above methodologies can be sensitive to the regularization strength and can sacrifice too much accuracy.

Nonetheless, even though bias mitigation algorithms can be provided, for contexts involving consequential decision-making applications, mitigating unwanted biases in machine learning models that yield systematic disadvantage to members of groups delineated by sensitive attributes such as demographics information is a key intervention to strive for equity. Further, it is desirable to improve the fairness of a pre-trained classifier, focusing on demographic parity and equality of opportunity, by dropping carefully selected training data points.

Given these problems, one or more embodiments described herein can be implemented to produce a solution to one or more of these problems in the form of systems, computer-implemented methods, and/or computer program products that can facilitate the following processes: receiving a pre-trained machine learning model and calculating a fairness influence score of training instances on group fairness metrics associated with the pre-trained machine learning model; and performing post-hoc unfairness mitigation by removing the effect of at least one of the training instances based on the fairness influence score. Such can be achieved by directly editing the trained model to eliminate the need of sensitive attribute labels at test time where the base model can be trained, unconstrained, on the main task, which can be updated to remove the influence of the harmful instances, thus, improving fairness. That is, embodiments described herein include one or more systems, computer implemented methods, apparatuses and/or computer program products that can facilitate one or more of the aforementioned processes.

FIG. 1 illustrates a block diagram of an example, non-limiting bias mitigation system 100 that comprises a training data influence estimation component 102 and an influence mitigation component 104. The training data influence estimation component 102 and the influence mitigation component 104 can be operatively connected such as to process/ analyze the pre-trained machine learning model via the bias mitigation system 100. The non-limiting bias mitigation system 100 can receive a pre-trained machine learning model and calculate a fairness influence score of training instances on group fairness metrics associated with the pre-trained machine learning model (e.g., via the training data influence estimation component 102). Additionally or alternatively, the non-limiting bias mitigation system 100 can perform post-hoc unfairness mitigation by removing the effect of at least one training instance based on the fairness influence score to mitigate biased training instances without refitting the pre-trained machine learning model (e.g., via the influence mitigation component 104). Repetitive description of like elements employed in other embodiments described herein is omitted for sake of brevity. Aspects of systems (e.g., the bias mitigation system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Additional description of functionalities will be further described below with reference to the example embodiments of FIGS. 1 and 2, where repetitive description of like elements and/or processes employed in respective embodiments is omitted for sake of brevity. The training data influence estimation component can receive as input a pre-trained model 106, a validation dataset 108, and fairness metrics 110. Further, the influence mitigation component 104 can receive input from the training data influence estimation component 102 and can output an edited model 112.

With embodiments, the training data influence estimation component 102 and the influence mitigation component 104 can be operatively linked together such as to process data for bias mitigation. In examples, the bias mitigation system 100 can be connected with a system bus 120, a processor 122, a memory/storage component 124, one or more networks 130, one or more input devices 132, and one or more computer application 134, which can be associated with cloud computing environment 900 (FIG. 9). In embodiments, the bias mitigation system 100 can be connected to process a model/ dataset via the training data influence estimation component 102, network(s) 130, input devices 132, and computer application(s) 134.

Figure 2:
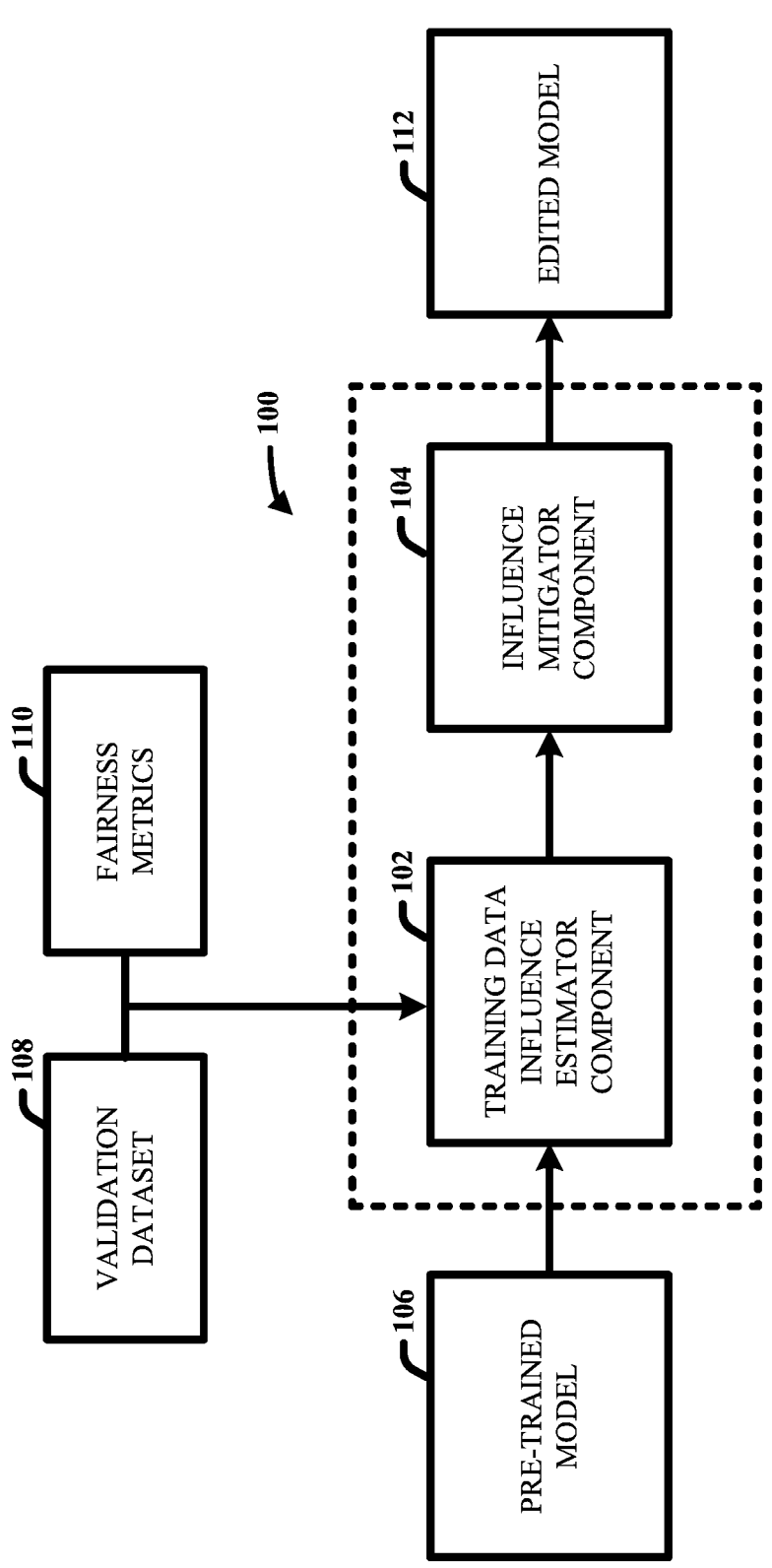
FIG. 2 illustrates a block diagram of an example, non-limiting system that can facilitate mitigating biased training instances associated with a machine learning model without additional refitting of the machine learning model, in accordance with one or more embodiments described herein.

In embodiments, FIGS. 1 and 2 illustrate block diagrams of an example, non-limiting bias mitigation system 100 that can address the challenges of mitigating biased training instances associated with a machine learning model without additional refitting of the machine learning model in accordance with one or more embodiments described herein. The training data influence estimation component 102 can estimate the influence of training instances on various group fairness metrics of interest. Additionally, the influence mitigation component 104 can perform post-hoc unfairness mitigation by approximately removing training instances that have a disproportional impact on group fairness. In estimating the influence, a Hessian matrix can be inverted. The training data influence estimation component 102 can utilize a WoodFisher based Inverse-Hessian Vector Product (IHVP) scheme for computing the fairness influence score of the training instances. Further, an IHVP-WoodFisher scheme can be used that does not require constraints (e.g., such as restricted Eigenspectrum of the loss curvature which can be difficult to satisfy in practice).

In embodiments, such as generally illustrated in FIG. 2, the non-limiting bias mitigation system 100 can include (receiving) a pre-trained model 106, access to one or more validation datasets 108, and one or more inputs regarding fairness metrics 110. Influential training instances can be identified by the system 100 such that the influence of harmful datapoints can be removed, thus resulting in an edited model 112 of the pre-trained model 106.

With embodiments, the non-limiting bias mitigation system 100 can consider a standard supervised learning setup; where, given a dataset $D=\{z_n=(x_n, y_n)\}_{n=1}^N$ features ($x_n \in \mathbb{R}^P$), response pairs ($y_n \in \mathcal{Y}$), a model $h_\theta(x)$ parameterized by a set of parameters $\theta \in \Theta \in \mathbb{R}^D$, and a loss function $\ell : \Theta \times \mathcal{Y} \to \mathbb{R}$, the empirical risk can be minimized by:

$$\hat{\theta} = \underset{\theta \in \Theta}{\mathrm{argmin}} \frac{1}{N} \sum_{n=1}^N \ell(y_n, h_\theta(x_n)), \tag{1}$$

to arrive at a trained predictor $h_{\hat{\theta}}(x)$. Further, for notational convenience, Equation 1 can be expressed as $$L(\theta) =^{def} \frac{1}{N} \sum_{n=1}^N \ell(y_n, h_\theta(x_n)).$$

Additionally, a weighted risk minimization problem can be considered:

$$\hat{\theta}(w) = \underset{\theta \in \Theta}{\mathrm{argmin}} \frac{1}{N} \sum_{n=1}^N w_l \ell(h_\theta(x_n)), \tag{2}$$

that weights the loss at each training instance by a scalar weight $w_n$ and denotes the column vector as $[w_1, w_2, \ldots, w_N]^T \in \mathbb{R}^N$. Further, the weights can be set to one, $1 \stackrel{def}{=} [w_1=1, w_2=1, \ldots, w_N=1]^T$, where minimizing the right-hand side of Equation 2 can recover the standard empirical risk minimization problem. Conversely, setting the $n^{th}$ coordinate to zero can recover the solution to an empirical risk minimization problem after dropping the $n^{th}$ training instance.

With embodiments, a Taylor approximation can be formed from Equation 2, where $\theta$ can be a function of the weights w:

$$\theta(w) = \hat{\theta} + \nabla_w \theta(w)|_{w=1}(w-1) + 0((w-1)^2), \tag{3}$$

where $\nabla_w \theta(w) \in \mathbb{R}^{D \times N}$ can be the Jacobian matrix (e.g., which can be referred to as the infinitesimal jackknife approximation). Further, in embodiments, the coordinate-wise gradient $$\frac{d\theta(w)}{dw_n} \Big|_{w_n=1}$$

can measure the effect of perturbing the weight of the $n^{th}$ data point on $\theta$ and can be referred to as the influence function because it measures the influence of the $n^{th}$ training instance on the model's parameters. A stationary point of $L(\theta)$ occurs when $\nabla_\theta L(\theta)=0$ (e.g., $L(\theta)$ can be twice differentiable in $\theta$), then, $$\frac{d\theta(w)}{dw_n} \Big|_{w=1} = -H^{-1} g_n, \tag{4}$$

where $H \stackrel{def}{=} \nabla_\theta^2 L(\theta)|_{\theta=\hat{\theta}}$, and $g_n \stackrel{def}{=} \nabla_\theta l(y_n, h_\theta(x_n))|_{\theta=\hat{\theta}}$. Equation 4 can approximate the gradient well in the vicinity of a stationary point with the accuracy of the approximation deteriorating smoothly with increasing distance from the stationary point. Further, the approximation can justify the use of influence functions even when stochastic optimization is used for minimizing Equation 1.

In non-limiting examples, the chain rule can be applied (e.g., via the training data influence estimation component 102) to measure the influence of a training instance on a differentiable functional, M, of $\theta(w)$:

$$I_{M,n} \stackrel{def}{=} \frac{dM(\theta(w), w)}{dw_n} \Big|_{w=1,\theta=\hat{\theta}} = -\nabla_\theta M(\theta(w), w)|_{w=1,\theta=\hat{\theta}}^T H^{-1} g_n \tag{5}$$

Further, the above equations can be utilized to approximate cross-validation, interpret black-box machine learning models, and assess the sensitivity of statistical analyses to training data perturbations (e.g., and additionally to reduce disparities of pre-trained models across groups).

With embodiments, such as generally illustrated by FIGS. 1 and 2, the bias mitigation system 100 can consider one or more sensitive attributes of the dataset (e.g., via the training data influence estimation component 102 and the influence mitigation component 104). For each data instance, a sensitive attribute, $s_n \in [k]$ (e.g., $D=\{z_n=(x_n, s_n, y_n)\}_{n=1}^N$), can be accessed that encodes the protected group membership of the $n^{th}$ data instance. Further, it is desired to learn accurate classifiers that can minimize disparities in predictions across groups via binary classifications, where $\mathcal{Y}=\{1,0\}$. Common fairness metrics can be considered when quantifying disparities across groups, such as demographic parity (DP) (e.g., statistical) and equality of odds (EO).

In examples, demographic parity can require the classifier's predictions to be statistically independent of the sensitive attribute, where X and S can be random variables representing the features and the sensitive attribute. Further, for a binary sensitive attribute, demographic parity can imply $P(h_\theta(X)=1|S=1)=P(h_\theta(X)=1|S=0)$. Conversely, equality of odds can require the classifier's predictions to be statistically independent of the sensitive attribute conditioned on the true outcome (e.g., $h_\theta(X) \perp\!\!\!\perp S|Y$). For a binary sensitive attribute, equality of odds can imply $P(h_\theta(X)=1|S=1, Y=y)=P(h_\theta(X)=1|S=0, Y=y)$ for both $y=0$ and $y=1$.

In embodiments, equality of opportunity (EQOPP) can be a special case of equality of odds where predictions are conditionally independent of the sensitive attribute given the true outcome is positive. A strategy for learning fair classifiers can be to set the difference in demographic parity to be close to zero while minimizing the empirical risk $\Delta DP(\theta)$ $=|P(h_\theta(X)=1|S=1)-P(h_\theta(X)=1|S=0)|$. Additionally, the difference in equality of odds can also be set close to zero while minimizing the empirical risk (e.g., Eq. 1) $\Delta EO(\theta)=\Sigma_{y=0}^1 |P(h_\theta(X)=1|S=1, Y=y)-P(h_\theta(X)=1|S=0, Y=y)|$. Smooth surrogates to $\Delta DP$ and $\Delta EO$ can be estimated from empirical distributions:

$$M_D^{\Delta DP}(\theta) = \left| \mathbb{E}_{p_D(X=x|S=1)}[h_\theta(x)] - \mathbb{E}_{p_D(X=x|S=0)}[h_\theta(x)] \right| \tag{6}$$

$$M_D^{\Delta EO}(\theta) = \sum_{y=0}^1 \left| \mathbb{E}_{p_D(X=x|S=0,Y=y)}[h_\theta(x)] - \mathbb{E}_{p_D(X=x|S=1,Y=y)}[h_\theta(x)] \right|,$$

where $M_a^b(\theta)$ denotes the surrogate for the fairness metric b estimated from dataset a. Further, when $\theta$ is itself a function of w, we can use the notation $M_a^b(w), w)$.

With embodiments, a post-processing fairness algorithm can improve the fairness characteristics of a pre-trained model without requiring the model to be refit by receiving (i) a pre-trained model 106; (ii) access to a validation dataset 108 and fairness metrics 110; and (iii) twice differentiability of the loss function and invertibility of the Hessian at a local optimum of the loss. Further, a held-out validation set $\mathcal{D}_{val}=\{x_n, s_n, y_n\}_{n=1}^{N_{val}}$ can be used to estimate $M_{\mathcal{D}_{val}}^{\Delta DP}(\theta)$ and $M_{\mathcal{D}_{val}}^{\Delta EO}(\theta)$. The result in Equation 5 can be leveraged to compute the influence of the $n^{th}$ training instance on $\Delta DP$, $$\mathcal{I}_{\Delta DP,n} = -\nabla_\theta M_{\mathcal{D}_{val}}^{\Delta DP}(\hat\theta)^T H^{-1} g_n, \tag{7}$$

$$= -\nabla_\theta \left| \mathbb{E}_{p_{\mathcal{D}}(X=x|S=1)}[h_\theta(x)] - \mathbb{E}_{p_{\mathcal{D}}(X=x|S=0)}[h_\theta(x)] \right| \Big|_{\theta=\hat\theta} H^{-1} g_n,$$

and on $\Delta EO$, $$\mathcal{I}_{\Delta EO,n} = -\nabla_\theta M_{\mathcal{D}_{val}}^{\Delta EO}(\hat\theta)^T H^{-1} g_n,$$

$$= -\nabla_\theta \left| \sum_{y=0}^1 \mathbb{E}_{p_{\mathcal{D}}(X=x|S=0,Y=y)}[h_\theta(x)] - \mathbb{E}_{p_{\mathcal{D}}(X=x|S=1,Y=y)}[h_\theta(x)] \right| \Big|_{\theta=\hat\theta} H^{-1} g_n,$$

where $M_{\mathcal{D}_{val}}^{\Delta DP}(\hat\theta)$ and $M_{\mathcal{D}_{val}}^{\Delta EO}(\hat\theta)$ can be used to denote $M_{\mathcal{D}_{val}}^{\Delta DP}(\theta(w), w)|_{w=1,\theta=\hat\theta}$ and $M_{\mathcal{D}_{val}}^{\Delta EO}(\theta(w), w)|_{w=1,\theta=\hat\theta}$. Computing the influence of a training instance on one or more group fairness metric can involve solving a single empirical risk minimization problem to recover $\hat\theta$. Further, the fairness metrics can also be estimated on the training data in the case that the system 100 does not receive a validation dataset (e.g., the addition of a validation dataset as input can improve the system 100 results).

Figure 3:
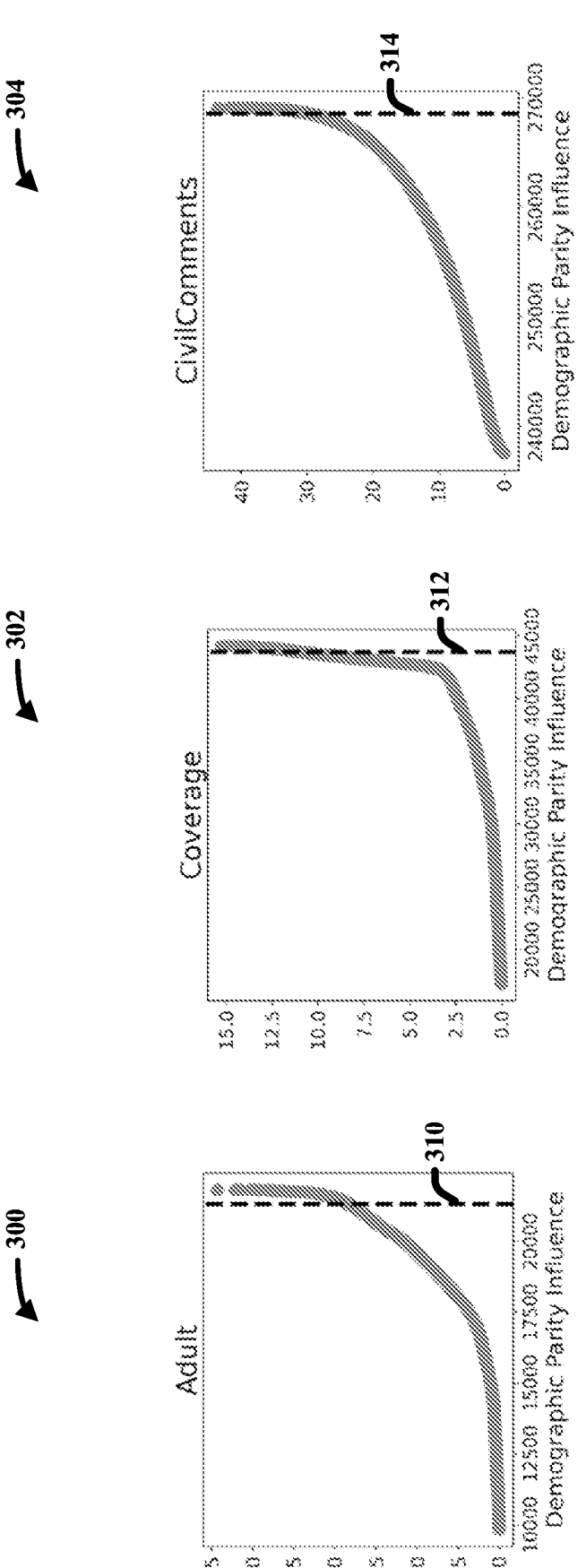
FIG. 3 illustrates a series of plots representing sorted influence scores of training instances, in accordance with one or more embodiments described herein.

As generally illustrated in FIG. 3, plots 300, 302, and 304 indicate influence scores of training instances on the average demographic parity of a held-out validation set for one or more of a variety of datasets. For example, plot 300 illustrates the sorted influence scores of training instances ran on an Adult dataset; whereby demographic parity improves from about 0.18 to about 0.01. Additionally plot 302 illustrates the sorted influence scores of training instances ran on a Coverage dataset; whereby demographic parity improves from about 0.22 to about 0.01. Plot 304 illustrates the sorted influence scores of training instances ran on a CivilComments dataset; whereby demographic parity improves from about 0.17 to about 0.03.

In the various plots 300, 302, 304 the non-limiting bias mitigation system 100 can mitigate the effect of influential datapoints from the training data (e.g., such that the system 100 can perform as if the original model was retrained.) Training instances with positive influence on demographic parity are plotted in the histogram plots 300, 302, and 304. Further, datapoints to the right of the dotted lines 310, 312, 314 are the top-500 training instances and models adjusted to mitigate the training instance influence (e.g. and are as a result substantially more fair). Dropping the top k most influential instances can yield improves bias mitigation. For instance, the validation dataset 108 can be used to select the hyperparameter k.

Now, turning back to Equation 3, in example embodiments, the influence mitigation component 104 can facilitate post-hoc fairness improvement of a pre-trained model $\theta$ by searching for a weight vector $w_{fair}$, such that $M_a^b(\hat\theta_{fair}) \approx 0$, where, $$\hat\theta_{fair} \stackrel{def}{=} \hat\theta(w_{fair}) = \hat\theta + \sum_{n=1}^N \frac{d\theta(w)}{dw_n}|_{w=1} \left(w_n^{fair} - 1\right), \tag{9}$$

$$= \hat\theta - \sum_{n=1}^N H^{-1} g_n \left(w_n^{fair} - 1\right),$$

and $w_{fair}=[w_1^{fair}, w_2^{fair}, \ldots, w_N^{fair}]^T \in R^N$. Gradient-based methods can be used to learn $w_{fair}$ by optimizing a desired $M(\theta(w), w)$ with respect to w. However, computing an inverting the Hessian requires $\mathcal{O}(ND^2+D^3)$ operations and can be prohibitively expensive for large models. Therefore, iterative procedures involving repeated Hessian-vector products can be utilized in light of the demanding computational power. Further, a gradient can perform the iterative procedure (e.g., computing and inverting the Hessian) after $$\tag{8}$$

each gradient step, which can cause the procedure to be computationally intractable. Moreover, solely optimizing $M(\theta(w), w)$ can result in fair but inaccurate classifiers, where the optimized weights are not able to be interpreted. The above concerns of computational power, accuracy, and interpretability can be circumvented by constraining the elements of w to be binary.

With embodiments, conditions in which $w_{fair}$ as constructed above can lead to classifiers with lower group disparities includes the following constraints: (i) $1 \in \mathbb{R}^N$ can denote an N-dimensional vector of all ones; (ii) b can denote a fairness metric, $\overline{M}_{D_{val}}^b(\theta(w), w)$ can denote a linearized approximation to $M_{D_{val}}^b(\theta(w), w)$ about 1; and (iii) $1(\alpha>\beta)$ can denote an indicator function that takes the value one if $\alpha>\beta$ is true and zero otherwise. Among binary vectors $w \in \{0, 1\}^N$, the vector $w_{fair}$ with $w_n^{fair}=1-1(I_{b,n}>0)$ can minimize:

$$\overline{M}_{D_{val}}^b(\theta(w),w) - M_{D_{val}}^b(\theta(1),1),$$

where the minimum value is negative. Further, the non-limiting bias mitigation system 100 can denote $M_{D_{val}}{}^b(\theta):=M_{D_{val}}(\theta(1),\,1)$ and form a first order Taylor approximation about 1, resulting in, $$\overline{M}^b_{D_{val}}(\theta(w),\,w) = M^b_{D_{val}}(\hat{\theta}) + \sum_{n=1}^{N} \frac{dM^b_{d_{val}}(\hat{\theta}(w),\,w)}{dw_n}\bigg|_{w=1,\theta=\hat{\theta}} (w_n - 1),$$

(10)

$$= M^b_{D_{val}}(\hat{\theta}) + \sum_{n=1}^{N} \mathcal{I}_{b,n}(w_n - 1)$$

Rearranging terms from Equation 10 can yield, $$\overline{M}^b_{D_{val}}(\theta(w),\,w) - M^b_{D_{val}}(\hat{\theta}) = \sum_{n=1}^{N}\mathcal{I}_{b,n}(w_n - 1) =$$

(11)

$$\sum_{n=1}^{N} 1(\mathcal{I}_{b,n} > 0)\mathcal{I}_{b,n}(w_n - 1) + \sum_{n=1}^{N} 1(\mathcal{I}_{b,n} \le 0)\mathcal{I}_{b,n}(w_n - 1).$$

The result follows from observing that $w_n \in \{0, 1\}$ and noting that the first term can be either zero (e.g., if $w_n=1$ when $1(\mathcal{I}_{b,n}>0)$) or negative (e.g., if $w_n=0$ when $1(\mathcal{I}_{b,n}>0)$). The second term can be either zero (e.g., if $w_n=1$ when $1(\mathcal{I}_{b,n}\le0)$) or positive (e.g., if $w_n=0$ when $1(\mathcal{I}_{b,n}\le0)$). Additionally, it follows that $M_{D_{val}}{}^b(\theta(w_{fair}),\,w_{fair})\lesssim M_{D_{val}}{}^b(\hat{\theta}(1),\,1))$, with the inequality holding when the linearization is accurate. The post hoc-mitigated classifier can be defined by plugging in the zeroed-out $w_{fair}$ from Equation 9, $$\hat{\theta}_{fair} = \hat{\theta} + \sum_{m\in\mathcal{D}_-} H^{-1}g_m.$$

(12)

In embodiments, the non-limiting bias mitigation system 100 (e.g., the training data influence estimation component 102) can employ a WoodFisher approximation for estimating the inverse of the Hessian. The WoodFisher approximation provides the following recurrence relation for estimating the inverse of the Hessian:

$$\hat{H}^{-1}_{n+1} = \hat{H}^{-1}_n - \frac{\hat{H}^{-1}_n\nabla_\theta\ell(y_{n+1},\,h_\theta(x_{n+1}))\nabla_\theta\ell(y_{n+1},\,h_\theta(x_{n+1})^\top\hat{H}^{-1}_n}{N + \nabla_\theta\ell(y_{n+1},\,h_\theta(x_{n+1}))^\top\hat{H}^{-1}_n\nabla_\theta\ell(y_{n+1},\,h_\theta(x_{n+1}))},$$

(13)

with $\hat{H}_0^{-1}=\lambda^{-1}I_D$, and $\lambda0$ a small positive scalar. In computing influence functions, the product of the inverse Hessian with a vector v can be stored (e.g., which should occupy $\mathcal{O}(D)$ storage). Typically, to compute the inverse Hessian and then the Hessian-vector product (HVP), $\mathcal{O}(D^2)$ storage would be used. Further, to limit the storage to $\mathcal{O}(D)$, IHVP-WoodFisher coupled recurrences can be utilized, $$o_{n+1} = o_n - \frac{o_n\nabla_\theta\ell(z_{n+1})^\top o_n}{N + \nabla_\theta\ell(z_{n+1})^\top o_n},\ k_{n+1} = k_n - \frac{o_n\nabla_\theta\ell(z_{n+1})^\top k_n}{N + \nabla_\theta\ell(z_{n+1})^\top o_n},$$

(14)

where, $\ell(z_{n+1})$ can be used as shorthand for $\ell(y_{n+1},\,h_\theta(x_{n+1}))$, $o_1=\nabla_\theta\ell(y_1,\,h_\theta(x_1))$, and $k_1=v$. The WoodFisher Hessian estimate $\hat{H}$ differs with the true Hessian by a scaling factor (e.g., $\hat{H}\propto H$). Therefore, the IHVP-WoodFisher estimates can be scaled using the validation dataset.

With embodiments, $w_{fair}$ can be constructed by zeroing out coordinates of $w_{fair}$ that correspond to training instances with a positive influence on the fairness metric of interest (e.g., an inherently interpretable process). Setting an element to zero can imply training without the corresponding training instance. In examples, the training data influence estimation component 102 and the influence mitigation component 104 can zero out instances with positive influence; therefore, refitting the pre-trained model after dropping training instances that increase disparity across groups. Further, to account for original loss $\ell$ of the system 100, the influence $\mathcal{I}_{\ell,n}$ of each training instance on the validation loss can be computed $$L_{\mathcal{D}_{val}}(\theta) = \frac{1}{N_{val}}\sum_{n=1}^{N_{val}}\ell(y_n,\,h_\theta(x_n))$$

and set, $$w_n{}^{fair}=1-1[\mathcal{I}_{M,n}>0]1[\mathcal{I}_{\ell,n}>0],$$

(15)

where training instances can be zeroed out with a positive influence on both the fairness metric and the original loss $\ell$. The post-hoc mitigated classifier can be defined and determined by plugging in the zeroed-out $w_{fair}$ from Equation 9 and defining $\mathcal{D}\_=\{z_n|z_n\in\mathcal{D}$ and $\mathcal{I}_{M,n}>0\ \&\ \mathcal{I}_{\ell,n}>0\}$, resulting in:

$$\hat{\theta}_{fair} = \hat{\theta} + \sum_{m\in\mathcal{D}_-} H^{-1}g_m.$$

(16)

Turning now to FIG. 4, an example non-limiting bias mitigation algorithm 400 can facilitate mitigating biased training instances associated with a machine learning model without additional refitting of the machine learning model. Further, the algorithm 400 ("FairIJ") can receive a pre-trained machine learning model and calculate a fairness influence score of training instances on group fairness metrics associated with the pre-trained machine learning model. Additionally, the algorithm 400 can perform post-hoc unfairness mitigation by removing the effect of at least one of the training instances based on the fairness influence score. The algorithm can include removing the effect of at least one training instance having a disproportional impact on group fairness based on the fairness influence score; and can employ an inverse Hessian vector product in calculating the fairness influence score.

Further, the algorithm can include computing the product of the inverse Hessian vector product and a gradient of a loss function of the training instances. To estimate the inverse Hessian vector product, the algorithm can employ a Wood-Fisher approximation. The algorithm can partially edit a foundational model (e.g., the pre-trained model 106) via embedding tunning to mitigate the influence of harmful training instances as identified by the fairness influence score.

Figure 5:
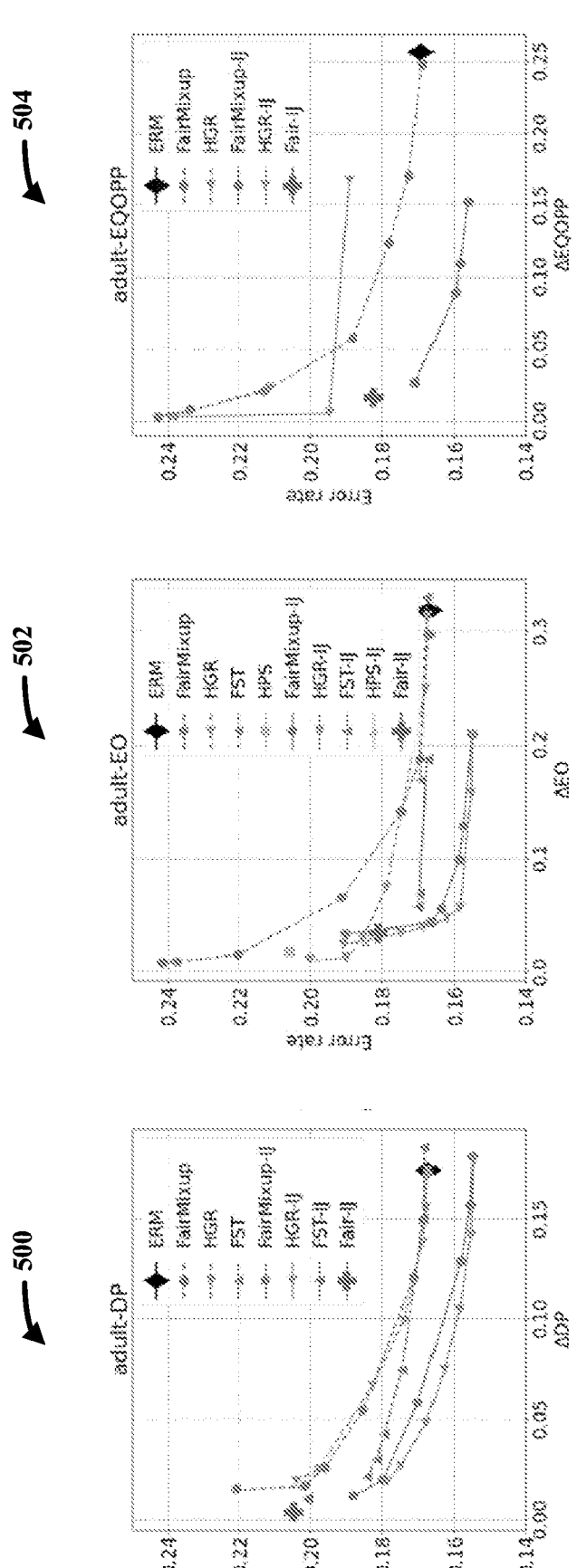
FIG. 5 illustrates accuracy and fairness Pareto frontier data plots for the Adult dataset averaged over a plurality of runs, in accordance with one or more embodiments described herein.
Figure 6:
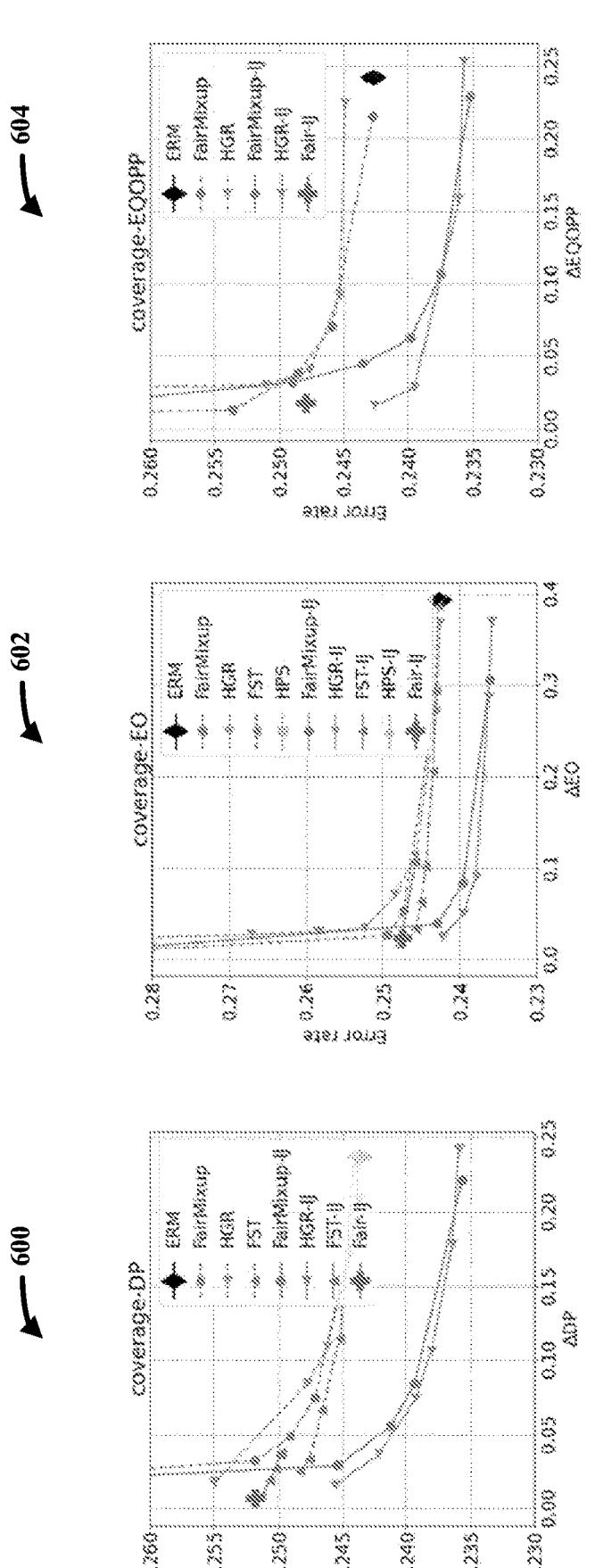
FIG. 6 illustrates accuracy and fairness Pareto frontier data plots for the Coverage dataset averaged over a plurality of runs, in accordance with one or more embodiments described herein.
Figure 8:
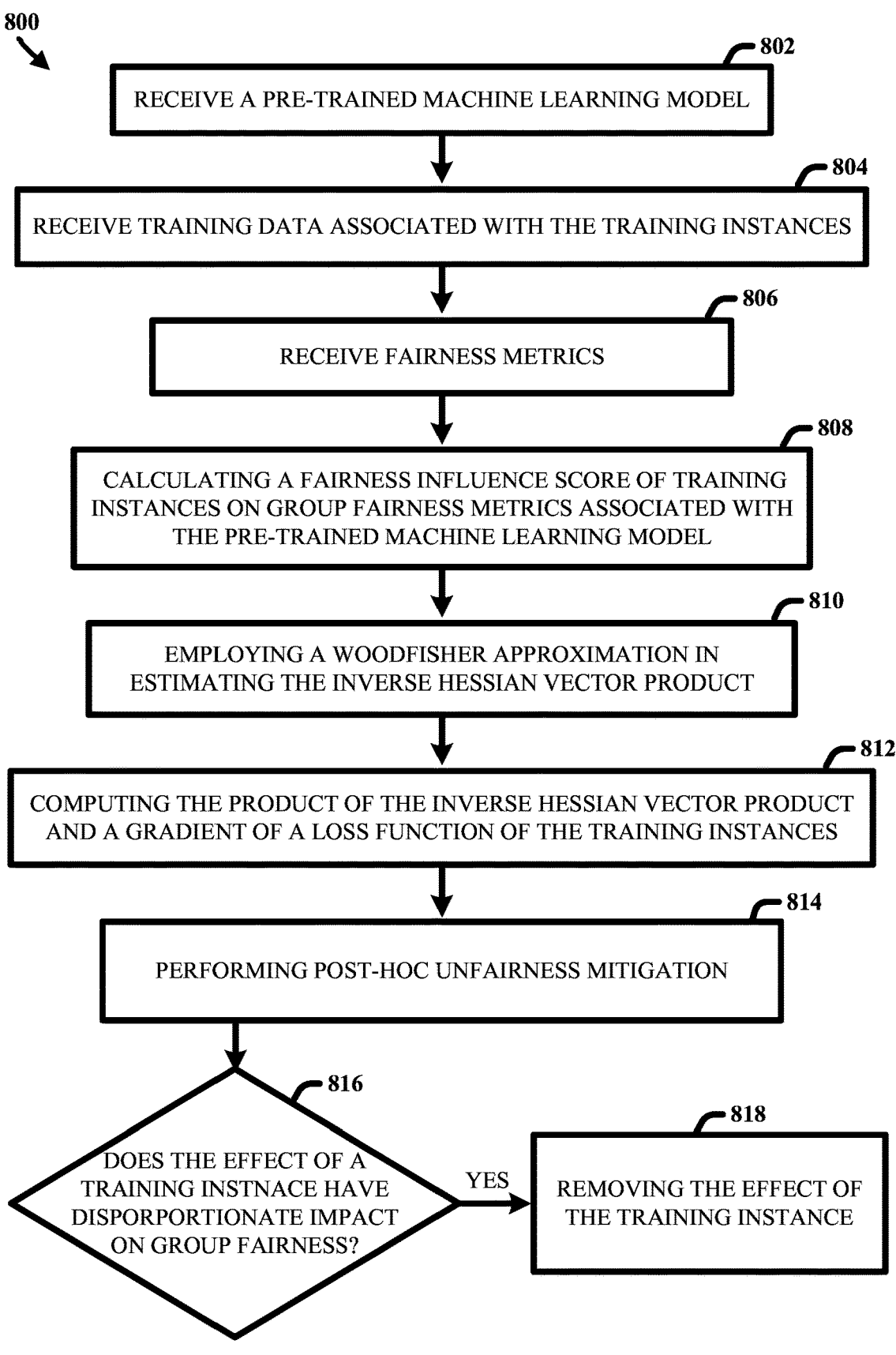
FIG. 8 illustrates a non-limiting computer implemented method that can facilitate mitigating biased training instances associated with a machine learning model without additional refitting of the machine learning model, in accordance with one or more embodiments described herein.

Turning next to FIGS. 5 and 6, the bias mitigation system 100 and the algorithm 400 can be tested/analyzed on one or more of a variety of datasets. For example and without limitation, the Adult dataset can be used to predict if a person has an income above a threshold where demographic information can be used as the sensitive attribute for the Adult fixed test set (e.g., a random 33% of the training data can be used as the validation set for experiments on the Adult dataset and the Coverage dataset). The Coverage dataset can be used to predict if a person has public health insurance coverage, where demographic information can be used as the sensitive attribute. FIGS. 5 and 6 indicate accuracy and fairness Pareto frontier plots for the Adult and Coverage datasets, respectively, averaged over 10 runs, where datapoints closer to the bottom-left can achieve the best fairness/accuracy tradeoff.

In examples, initializing the system 100 can include training a 1-hidden layer fully connected neural network with a SeLu activation function and 100 hidden units as an initial model. The initial model can be trained using standard Empirical Risk Minimization (ERM) loss with a batch size set to 256. An Adam optimizer can be used with a learning rate set to $10^{-4}$. The ERM and baselines can be trained for 100 epochs and the checkpoint with the best accuracy on the validation set can be selected. Next, the "FairIJ" algorithm 400 can be employed to achieve a solution where the best k and IVHP scaling are determined based on the same validation set to compute influence scores.

As seen from FIG. 5, plot 500 illustrates demographic parity values from applying the "FairIJ" algorithm 400 to the Adult dataset. Further, plot 502 illustrates equality of odds values from applying the algorithm 400 to the Adult dataset, and plot 504 illustrates equality of opportunity values from applying the algorithm 400 to the Adult dataset. Similarly, as seen from FIG. 6, plots 600, 602, and 604 depict demographic parity values, equality of odds values, and equality of opportunity values from applying the "FairIJ" algorithm 400 to the Coverage dataset. Plots 500, 502, 504, 506, 602, and 604 compare the method of the non-limiting bias mitigation system 100 to one or more of a variety of in-processing and post-processing bias mitigation algorithms that can be applicable to a wide range of model classes including deep neural networks. For example, the algorithm 400 can be compared with in-processing algorithms FairMixup and HGR. FairMixup achieves fairness through a mixup-based regularization that can be employed during training. The HGR approach proposes a surrogate to HGR dependence measure and can promote fairness during training by enforcing conditional independence implied by the fairness metrics (e.g., for both FairMixup and HGR algorithms, the fairness accuracy trade-off is achieved via the strength of the regularizer).

Further, for common post-processing methods/algorithms, FST and HPS can be compared in relation to the "FairIJ" Algorithm to assess performance. FST can optimally transform the pre-trained model's prediction scores to satisfy a specified fairness constraint and supports DP and EO metrics. The performance of FST can be improved by re-calibrating the prediction scores using isotonic Regression. Additionally, HPS can be designed to enforce EO and can require knowledge of the sensitive attribute at test time. A fixed pre-trained model can be used as well as architecture and training procedures for all the baselines. Further, a baseline can be run on the edited model obtained from the output of the "FairIJ" algorithm 400, $\hat{\theta}_{fair}$. The algorithm solution can be finely tuned using in-processing algorithms. In the case of post-processing algorithms, such algorithms can be applied directly to the "FairIJ" edited model. As illustrated in FIGS. 5 and 6, "FairIJ" algorithm 400 can consistently produce lower disparities across a variety of datasets and metrics. Moreover, baselines operating on $\hat{\theta}_{fair}$, FairMixup-IJ, HGR-IJ, FST-IJ, and HPS-IJ often achieve substantially better accuracy/fairness trade-off over their counterparts.

With embodiments, such as generally illustrated in FIG. 7, the non-limiting bias mitigation system 100 can be used to predict whether a particular comment is toxic based on access to a CivilComments dataset consisting of human-annotated attributes on hate comments posted on the internet. For example, the word "Muslim" can be considered as the sensitive attribute for the CivilComments dataset. An instance can be assigned to the unprivileged group when it is annotated with the sensitive attribute and the remainder can be assigned to the privileged group. Further, three variants of the pre-trained frozen BERT model can be considered in demonstrating the adaptability of the system 100 on large neural networks. In accordance with tables 700 and 702, $BERT_{LC}$ is a linear classifier head; $BERT_{NC}$ is a non-linear classifier head; and $BERT_{TT=N}$ includes n trigger-tokens in the embedding layer. Additionally, an extension of prompt-tuning or prefix-tuning methods can be a more powerful way of fine-tuning large-language models than solely updating classifier heads (the adaptation of trigger-tokens scale fittingly in optimizing weights from Equation 9). The results can be compared with the method of Gap Regularization (GapReg) where a model optimization can be regularized by a fairness measure added to the training loss while scaled by λ to control the regularizer magnitude.

In embodiments, turning to the results of tables 700 and 702, "FairIJ" consistently performs better in mitigating group disparities than via baseline methods ERM and GapReg. Additionally, "FairIJ" includes a better task performance (balanced accuracy for toxicity classification) trade-off while attempting to achieve lower disparity. Results for virtual trigger-tokens (see, e.g., table 702) perform equally well in lowering the disparity. As such, "FairIJ" algorithm 400 can be efficiently integrated with large neural networks through the scalable influence calculation of relatively few trigger parameters.

With embodiments, a computer-implemented method 800 of mitigating biased training instances associated with a machine learning model without additional refitting of the machine learning model can comprise receiving a pre-trained machine learning model (step 802), receiving training data associated with the training instances (step 804), and receiving one or more fairness metrics (step 806). The method 800 can include calculating a fairness influence score of training instances on group fairness metrics associated with the pre-trained machine learning model (step 808). Further, the method can include employing a Wood-Fisher approximation in estimating the inverse Hessian vector product (step 810).

Additionally, the method can include computing the product of the inverse Hessian vector product and gradient of a loss function of the training instances (step 812). Further, the method can include performing post-hoc unfairness mitigation (step 814) to reduce or limit the effect of a training instance. The method can include determining whether the effect of a training instance has a disproportionate impact on group fairness (816), whereby the effect of the disproportionate training instance is removed (step 818) resulting in the edited model.

For example, one or more embodiments described herein of the bias mitigation system 100 and/or one or more components thereof can employ one or more computing resources of the computing environment 900 described below with reference to the illustration of FIG. 9. For instance, the system and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML)

models and/or like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

A cloud computing environment is service oriented with a focus on statelessness, low coupling, modularity and/or semantic interoperability. At the heart of cloud computing is an infrastructure that includes a network of interconnected nodes.

Moreover, the bias mitigation system 100 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, the bias mitigation system 100 can be employed to use hardware and/or software to solve problems that are highly technical in nature, that are not abstract and/or that cannot be performed as a set of mental acts by a human.

It should be appreciated that the embodiments depicted in various figures disclosed herein are for illustration only, and as such, the architecture of embodiments is not limited to the systems, devices and/or components depicted therein, nor to any particular order, connection and/or coupling of systems, devices and/or components depicted therein. For example, in some embodiments, the bias mitigation system 100 can further comprise various computer and/or computing-based elements described herein with reference to computing environment 900 and FIG. 9. In several embodiments, computer and/or computing-based elements can be used in connection with implementing one or more of the systems, devices, components and/or computer-implemented operations shown and described in connection with FIG. 1 or with other figures disclosed herein.

Memory 124 can store one or more computer and/or machine readable, writable and/or executable components and/or instructions that, when executed by processor 122 (e.g., a classical processor, a quantum processor and/or like processor), can facilitate performance of operations defined by the executable component(s) and/or instruction(s). For example, memory 124 can store computer and/or machine readable, writable and/or executable components and/or instructions that, when executed by processor 122, can facilitate execution of the various functions described herein relating to the training data influence estimation component 102, the influence mitigation component 104, and/or another component associated with the bias mitigation system 100 as described herein with or without reference to the various figures of the one or more embodiments.

Memory 124 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 124 are described below with reference to system volatile memory 912 and FIG. 9. These examples of memory 124 can be employed to implement any one or more embodiments described herein.

Processor 122 can comprise one or more types of processors and/or electronic circuitry (e.g., a classical processor, a quantum processor and/or like processor) that can implement one or more computer and/or machine readable, writable and/or executable components and/or instructions that can be stored at memory 124. For example, processor 122 can perform various operations that can be specified by computer and/or machine readable, writable and/or executable components and/or instructions including, but not limited to, logic, control, input/output (I/O), arithmetic and/or the like. In some embodiments, processor 122 can comprise one or more central processing units, multi-core processors, microprocessors, dual microprocessors, microcontrollers, System on a Chip (SOCs), array processors, vector processors, quantum processors and/or another type of processor. Additional examples of processor 122 are described below with reference to processor set 910 and FIG. 9. The examples of processor 122 can be employed to implement any one or more embodiments described herein.

The bias mitigation system 100, the training data influence estimation component 102, the influence mitigation component 104, the processor 122, the memory 124, and/or another component of system 100 as described herein can be communicatively, electrically, operatively and/or optically coupled to one another via system bus 120 to perform functions of system 100 and/or any components coupled therewith. System bus 120 can comprise one or more memory buses, memory controllers, peripheral buses, external buses, local buses, a quantum buses and/or another type of bus that can employ various bus architectures. The examples of system bus 120 can be employed to implement any one or more embodiments described herein.

The bias mitigation system 100 can comprise any type of component, machine, device, facility, apparatus and/or instrument that comprises a processor and/or can be capable of effective and/or operative communication with a wired and/or wireless network. All suitable such embodiments are envisioned. For example, the bias mitigation system 100 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players and/or another type of device.

The bias mitigation system 100 can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In some embodiments, the bias mitigation system 100 can be coupled (e.g., communicatively, electrically, operatively, optically and/or the like) to one or more external systems, sources and/or devices (e.g., classical and/or quantum computing devices, communication devices and/or the like) via a network.

In some embodiments, a network 130 can comprise one or more wired and/or wireless networks, including, but not limited to, a cellular network, a wide area network (WAN) (e.g., the Internet), or a local area network (LAN). For example, the bias mitigation system 100, the training data influence estimation component 102 and the influence mitigation component 104 can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802. XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, the bias mitigation system 100 can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that facilitates communicating information among the bias mitigation system 100 and external systems, sources and/or devices (e.g., computing devices, communication devices and/or the like).

The bias mitigation system 100 can comprise one or more computer and/or machine readable, writable and/or executable components and/or instructions that, when executed by processor 122 (e.g., a classical processor, a quantum processor and/or the like), can facilitate performance of one or more operations defined by such component(s) and/or instruction(s). Further, in numerous embodiments, any component associated with the bias mitigation system 100, as described herein with or without reference to the various figures of the one or more embodiments, can comprise one or more computer and/or machine readable, writable and/or executable components and/or instructions that, when executed by processor 122, can facilitate performance of one or more operations defined by such component(s) and/or instruction(s). For example, the training data influence estimation component 102, the influence mitigation component 104, and/or any other components associated with the bias mitigation system 100 as disclosed herein (e.g., communicatively, electronically, operatively and/or optically coupled with and/or employed by system 100), can comprise such computer and/or machine readable, writable and/or executable component(s) and/or instruction(s). Consequently, according to numerous embodiments, the bias mitigation system 100 and/or any components associated therewith as disclosed herein, can employ processor 122 to execute such computer and/or machine readable, writable and/or executable component(s) and/or instruction(s) to facilitate performance of one or more operations described herein with reference to system 100 and/or any such components associated therewith.

The bias mitigation system 100 can facilitate (e.g., via processor 122) performance of operations executed by and/ or associated with training data influence estimation component 102, the influence mitigation component 104, and/or another component associated with system 100 as disclosed herein. For instance, as described in detail below, the bias mitigation system 100 can facilitate via processor 122 (e.g., a classical processor, a quantum processor and/or the like): generating one or more language invariant signals; generating a complete query intent using the one or more language invariant signals; and/or processing the complete query intent to an executable backend query to facilitate multilingual query interpretation. As will be apparent from the below, one or more systems can be employed to facilitate zero-shot transfer of the one or more language invariant signals (e.g., such as to be independent of domain/language specific training).

In embodiments, the bias mitigation system 100 can include one or more training data influence estimation components 102, one or more influence mitigation components 104, one or more system buses 120, one or more processors 122, one or more memory/storage components 124, one or more networks 130, one or more input devices 132, and/or one or more computer applications 134. The training data influence estimation component 102 and the influence mitigation component 104 can be connected with one or more machines comprised by the bias mitigation system 100. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

Turning next to FIG. 9, the following discussion and associated figure are intended to provide a general description of a suitable computing environment 900 in which one or more embodiments described herein at FIGS. 1-8 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as bias mitigation code block 1000. In addition to block 1000, computing environment 900 includes, for example, computer 901, wide area network (WAN) 902, end user device (EUD) 903, remote server 904, public cloud 905, and private-cloud 906. In this embodiment, computer 901 includes processor set 910 (including processing circuitry 920 and cache 921), communication fabric 911, volatile memory 912, persistent storage 913 (including operating system 922 and block 1000, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 1000 in persistent storage 913.

COMMUNICATION FABRIC 911 is the signal conduction paths that allow the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface type operating systems that employ a kernel. The code included in block 1000 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE-CLOUD 906 is similar to public-cloud 905, except that the computing resources are only available for use by a single enterprise. While private-cloud 906 is depicted as being in communication with WAN 902, in other embodiments a private-cloud may be disconnected from the internet entirely and only accessible through a local/private network. A hybrid-cloud is a composition of multiple clouds of different types (for example, private-cloud, community-cloud, or public-cloud types), often respectively implemented by different vendors. Each of the multiple clouds remains a separate and discrete entity, but the larger hybrid-cloud architecture is bound together by standardized or proprietary technology that enables orchestration, management, and/or data/application portability between the multiple constituent clouds. In this embodiment, public-cloud 905 and private-cloud 906 are both part of a larger hybrid-cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages.

The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general-purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory that stores computer executable components; and
a processor, operatively coupled to the memory, and that executes the computer executable components stored in the memory, wherein the computer executable components comprise:
a training data influence estimation component that receives a pre-trained machine learning model and calculates a fairness influence score of training instances on group fairness metrics associated with the pre-trained machine learning model; and
an influence mitigation component that performs post-hoc unfairness mitigation by partially editing a foundational model via embedding tuning to remove the effect of at least one training instance based on the fairness influence score to mitigate biased training instances without refitting the pre-trained machine learning model.

2. The system of claim 1, wherein the influence mitigation component removes the effect of at least one training instance having a disproportional impact on group fairness based on the fairness influence score.

3. The system of claim 1, wherein the training data influence estimation component employs an inverse Hessian vector product in calculating the fairness influence score.

4. The system of claim 1, wherein the training data influence estimation component receives, as input, training data associated with the training instances and a validation data set.

5. The system of claim 3, wherein the training data influence estimation component computes a product of the inverse Hessian vector product and a gradient of a loss function of the training instances.

6. The system of claim 5, wherein the training data influence estimation component employs a WoodFisher approximation in estimating the inverse Hessian vector product.

7. The system of claim 1, wherein influence mitigation component partially edits a foundational model via embedding tuning to mitigate the influence of harmful training instances as identified by the fairness influence score.

8. A computer implemented method of mitigating biased training instances associated with a machine learning model without additional refitting of the machine learning model, the computer implemented method comprising:

receiving, using a processor, a pre-trained machine learning model and calculating a fairness influence score of training instances on group fairness metrics associated with the pre-trained machine learning model; and performing, using the processor, post-hoc unfairness mitigation by partially editing a foundational model via embedding tuning to remove the effect of at least one of the training instances based on the fairness influence score, without additional refitting of the pre-trained machine learning model.

9. The computer implemented method of claim 8, further comprising:

removing, using the processor, the effect of at least one training instance having a disproportional impact on group fairness based on the fairness influence score.

10. The computer implemented method of claim 8, further comprising:

employing, using the processor, an inverse Hessian vector product in calculating the fairness influence score.

11. The computer implemented method of claim 8, further comprising:

receiving, using the processor, training data associated with the training instances and a validation data set as input.

12. The computer implemented method of claim 10, further comprising:

computing, using the processor, the product of the inverse Hessian vector product and a gradient of a loss function of the training instances.

13. The computer implemented method of claim 12, further comprising:

employing, using the processor, a WoodFisher approximation in estimating the inverse Hessian vector product.

14. The computer implemented method of claim 8, further comprising:

partially editing, using the processor, the foundational model via embedding tuning to mitigate the influence of harmful training instances as identified by the fairness influence score.

15. A computer program product for mitigating biased training instances associated with a machine learning model without additional refitting of the machine learning model, the computer program product comprising a computer readable storage medium having program instructions embodied therewith, the program instructions executable by a processor to cause the processor to:

receive, using the processor, a pre-trained machine learning model and calculate a fairness influence score of training instances on group fairness metrics associated with the pre-trained machine learning model; and perform, using the processor, post-hoc unfairness mitigation by partially editing a foundational model via embedding tuning to remove the effect of at least one of the training instances based on the fairness influence score.

16. The computer program product of claim 15, wherein the program instructions further cause the processor to:

remove, using the processor, the effect of at least one training instance having a disproportional impact on group fairness based on the fairness influence score.

17. The computer program product of claim 15, wherein the program instructions further cause the processor to:

receive, using the processor, training data associated with the training instances and a validation data set as input.

18. The computer program product of claim 15, wherein the program instructions further cause the processor to:

employ, using the processor, an inverse Hessian vector product in calculating the fairness influence score; and compute, using the processor, the product of the inverse Hessian vector product and a gradient of a loss function of the training instances.

19. The computer program product of claim 18, wherein the program instructions further cause the processor to:

employ, using the processor, a WoodFisher approximation in estimating the inverse Hessian vector product.

20. The computer program product of claim 15, wherein the program instructions further cause the processor to:

partially edit, using the processor, the foundational model via embedding tuning to mitigate the influence of harmful training instances as identified by the fairness influence score.

* * * * *